Figures 1, 2, 3:
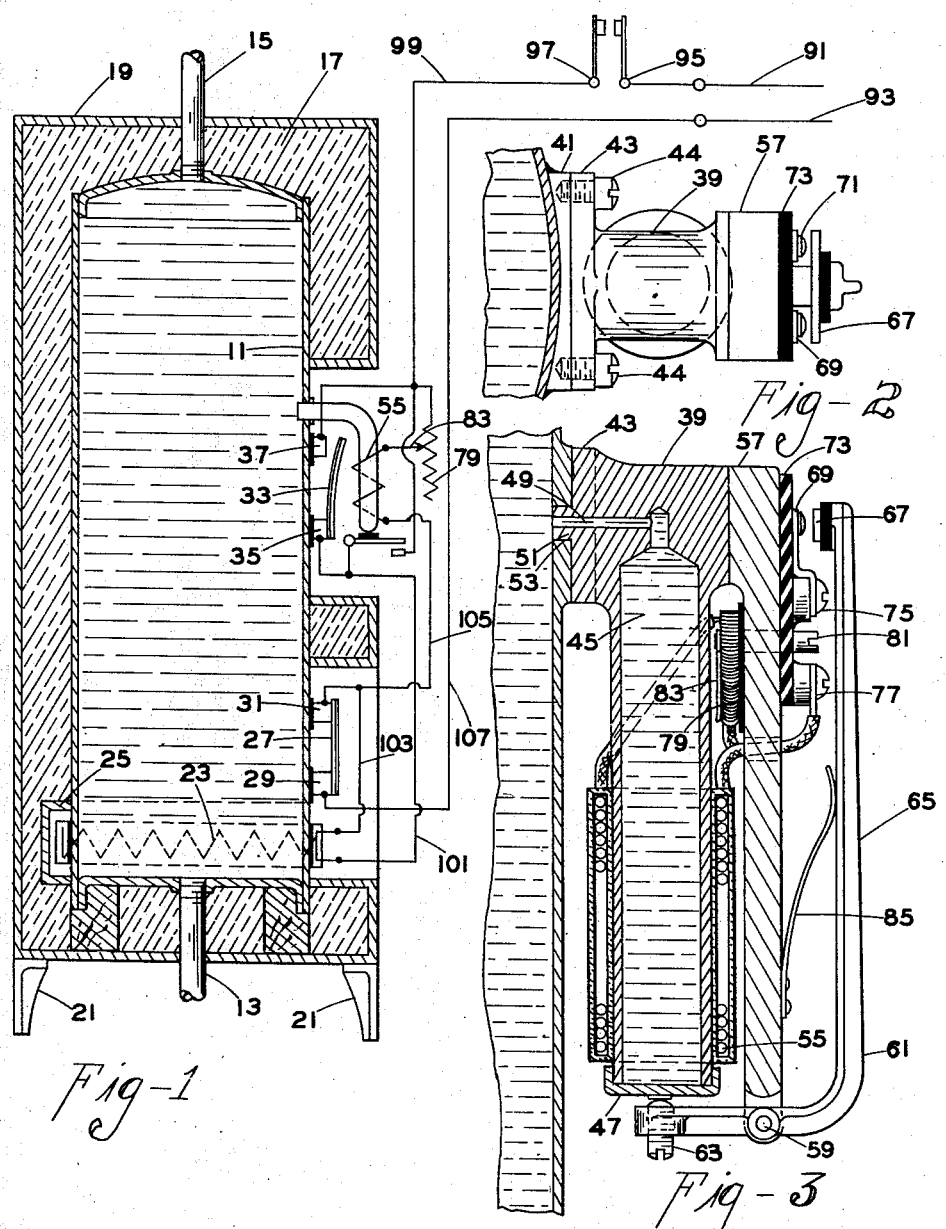

Dec. 12, 1950    C. M. OSTERHELD    2,533,614
THERMAL RETARDER
Filed July 27, 1946

INVENTOR.
CLARK M. OSTERHELD
BY
ATTY

Patented Dec. 12, 1950

2,533,614

UNITED STATES PATENT OFFICE 2,533,614

THERMAL RETARDER

Clark M. Osterheld, Stoughton, Wis., assignor to McGraw Electric Company, Elgin, Ill., a corporation of Delaware Application July 27, 1946, Serial No. 686,756

25 Claims. (Cl. 219—39)

My invention relates to electric heating and particularly to water heater control systems including a thermal retarder.

An object of my invention is to provide a water heater control system that shall cause energization of an electric heater for a hot water tank immediately in case of use of a relatively large quantity of hot water and that shall cause re-energization of a heater with a predetermined period of time delay in case of use of a relatively small quantity only of hot water from the tank.

Another object of my invention is to provide a control system for a tank heater that shall include a thermal retarder heater control switch unit of specific design and construction to effect immediate re-energization of a tank heater upon start of an off-peak period in case the tank contains a relatively large amount of cold water and to effect energization of the heater with a predetermined time period of delay in case only a relatively small amount of cold water is in the tank at the start of an off-peak period.

Other objects of my invention will either be apparent from a description of a thermal retarder and system embodying my invention or will be pointed out hereinafter and set forth in the appended claims.

In the drawings:

Figure 1 is a vertical sectional view of a domestic hot water tank and a diagram of electrical control circuits, the parts being shown in the positions they will occupy when the upper half of the tank contains hot water and the lower portion contains cold water during an on-peak period, Fig. 2 is a top plan view of the parts shown in Fig. 3, and, Fig. 3 is a vertical sectional view of a thermal retarder with the parts shown in the same position as in Fig. 1.

Referring first of all to Fig. 1 of the drawings, I have there illustrated an ordinary domestic hot water tank 11 having a lower cold water inlet 13 and an upper hot water outlet 15. The tank 11 may be enclosed in a mass 17 of heat insulation, which heat insulation is held in proper operative position by an outer case 19, which outer casing is supported by a plurality of legs 21, all in a manner well-known in the art.

I prefer to provide a single electric heater 23 which may be of any desired kind although I have shown the same as being covered by a tunnel member 25. The system embodying my invention provides a first thermally-actuable switch comprising a bimetal bar 27, one end, namely the lower, being supported by a block 29 of heat-conducting metal, the other end of bar 27 being adapted to engage with and be disengaged from an upper contact member 31. While I have shown a bimetal bar as the lower or first thermal control switch for the heater, I do not desire to be limited thereto since any other thermally-actuable control member may be used in its place.

The thermal retarder structure embodying my invention provides a second thermally-actuable element 33 in the form of a bimetal bar, the lower end of which is mounted in heat-conducting or receiving relation to the water in the tank on a small heat- and electric-conducting block 35. The upper end of bar 33 is adapted to engage with and be disengaged from a contact member 37.

The thermal retarder includes an elongated member 39 which may be made of a high expansion metal such as aluminum. Member 39 is adapted to be held in a steam and water proof manner against a boss 41 on tank 11, which boss 41 has a substantially flat outer surface and which is adapted to have a boss 43 of member 39 secured thereagainst by screws 44.

Member 39 is provided with a two-part conduit, the longer part being designated by number 45 and extending through the elongated portion of member 39 and to the end of said portion where part 45 of the conduit is closed by a closure member 47, which may be welded or soldered on the lower end of member 39. The second part 49 of the conduit extends at substantially right angles to the part 45 and is of a relatively small area of cross-section and connects with the upper end of part 45. Boss 43 is provided with an extension 51 thereon, which extension is fitted into an opening 53 in the wall of tank 11.

I provide an auxiliary heating element 55 which is insulatedly mounted on and around the lower part of member 39 so that heat generated by the passage of current through heating element 55 will reach the water in conduit 45 and cause heating thereof. The wattage loss in heating element 55 is relatively small as will be hereinafter set forth more in detail.

I provide a block 57 of metal which has substantially the same length as member 39 and has its upper end secured thereto and has at its lower end a pivot pin 59 to receive and pivotally support a lever arm 61 of substantially L-shape. The short arm of member 61 is pivotally supported on pivot pin 59 and has an adjusting screw 63 having screw-threaded engagement with the outer end portion of the horizontally extending arm. The vertical longer arm of lever arm 61 which may be numbered 65 extends in front of member 57 and is provided at its upper end with a contact bridging member 67, which is insulatedly mounted on the upper end of portion 65. Contact bridging member 67 is adapted to engage with and be disengaged from a pair of contacts 69 and 71 mounted on a small electric-insulating plate 73 secured to the front surface of member 57. Terminal members 75 are connected to the contact members 69 and 71.

One end of heating element winding 55 is connected to one terminal 77 while the other end of winding 55 is connected to one terminal of a rheostat 79, which may be adjusted as by a screw driver, a slotted rod 81 mounted in member 57 and effective to cause turning movement of a contact arm 83. A short leaf spring 85 is mounted against the front surface of member 57 and tends to hold contact bridging member 67 out of engagement with contacts 69 and 71.

Referring now to Fig. 1 again, I have there shown two conductors 91 and 93 of a standard electrical supply circuit, conductor 91 being connected to one contact arm 95 of a third control switch for the heating element 23 which contact arm is adapted to be moved into engagement with a second contact arm 97 by a continuously operative timing means. Since contact switches of this general kind are old and well-known in the art and are sometimes termed off-peak control switches, I have not deemed it necessary nor advisable to show the details of such timing means, it being understood that the two contact arms 95 and 97 will be out of engagement during onpeak periods of a 24-hour day and will be moved into engagement with each other during off-peak periods of a 24-hour day.

Contact arm 97 is connected by a conductor 99 with contact 37 and with one of the contacts 69 and 71. The terminal 77 of heating resistor 55 is connected to conductor 99. Contact 35 is connected by a conductor 101 to the other one of the contacts 69 and 71 as well as to one terminal of heater of electric heater 23, the other terminal of electric heater 23 being connected by a conductor 103 to contact 31 as well as by a conductor 105 to terminal 77 of heating element 55. Contact 29 of the first or lower thermally-actuable switch is connected by a conductor 107 to a supply circuit conductor 93.

It is to be understood that the design, construction of the adjustment and mounting of the first or lower thermally-actuable switch is such that it will respond to the temperature of the water in the tank 11, that is bimetal bar 27 will be in engagement with contact 31 when bimetal bar 27 is subject to the temperature of cold water and that it will be out of engagement therewith when subject to the temperature of hot water. Substantially the same comments apply to the bimetal bar 33 of the thermal retarder switch.

By the term cold water, I means water the temperature of which may be anything from ordinary room temperature of 70° F. up to a temperature of about 130° F., and by hot water I mean water the temperature of which may vary from 150° F. to 160° F.

Let it now be assumed that tank 11 has been filled with cold water and that the time controlled off-peak switch comprising contact arms 95 and 97 are in engagement with each other, which time may be about 10:00 p. m. or 11:00 p. m. In this case both the bimetal bars 27 and 33 will be in heater-energizing position so that an energizing circuit is closed immediately after closure of the time controlled switch the circuit being substantially as follows: from supply circuit conductor 91, through the engaged contact arms 95 and 97, through conductor 99 to contact member 37, through bimetal bar 33 to contact 35, through conductor 101, heater 23, through conductor 103, contact 31, through bimetal bar 27 and from there through conductor 107 to the second supply circuit conductor 93. This will cause temperature rise of the water in the tank particularly the water in the upper end of the tank and the lower level of the hot water will gradually move downwardly until it causes heating and flexing of the upper bimetal bar 33 out of engagement with contact member 37.

At the same time an energizing circuit will be closed through the small wattage auxiliary heater 55, this circuit being traceable as follows: from supply circuit conductor 91, through the closed time control switch contact arms 95 and 97, conductor 99, through that part of resistor 83 included in the circuit, through heater coil 55, through conductor 105, through bimetal bar 27 and from there through conductor 107 to the second supply circuit conductor 93. The wattage of a small auxiliary heating element 55 is made approximately such that it will vaporize substantially all of the water in part 45 of the conduit in member 39 forcing it out into tank 11 through the relatively small conduit 49 in from say, four to five hours. When enough water in member 39 has been either vaporized or heated to a relatively high degree above say 212° F., the portion surrounding the conduit 45 will start to expand and cause a turning movement of lever arm 61 and particularly of portion 65 thereof in a counter-clockwise direction against the pressure of spring 85 until contact bridging member 67 engages fixed contacts 69 and 71, which causes another circuit through electric heater 23 traceable as follows: from supply circuit conductor 91 through switch arms 95 and 97 which will still be in engagement with each other, through conductor 99, through engaged contacts 69, 71 with contact bridging member 67, through conductor 101, electric heater 23, through conductor 103, through bimetal bar 27 and through conductor 107 to the second supply circuit conductor 93. Thus immediately upon the closing of the clock contacts 95—97 at the end of the off peak period, the heater 23 is energized under control of thermostat 37 for heating the top half of the tank. Additionally after the time delay imposed by the retarder 39—45—55 the heater 23 is energized to heat the remainder of the tank. If during the time that contacts 95—97 are closed, the tank being full of hot water, only enough water is drawn to close thermostat 27, the energization of heater 23 will be delayed several hours, but if enough is drawn to close thermostat 33, the heater 23 will be energized immediately.

The use of the manually-adjustable rheostat 81 is to take care of variations of voltage in the supply circuit as well as variations in the demands made for hot water for tank 11 such as made by very early risers.

Various modifications may be made in the device embodied in this invention without departing from the spirit or scope thereof, and all such modifications clearly coming within the scope of the appended claims shall be considered as part of the invention.

I claim as my invention:

1. A water heater control system for a hot water tank having an electric heater and a thermal retarder switch unit comprising a thermal element subject to the temperature of the water in a tank intermediate the ends thereof, a member of high expansion material having a two part conduit therein, one part being a relatively short, small area of cross-section conduit and the other being a relatively long, larger area of conduit, said short part being in connection with the inside of the tank, a heating coil around said long part and a contact arm actuable by the material surrounding said long part of the conduit.

2. A water heater control system for a hot water tank having an electric heater and a thermal retarder switch unit adapted to be mounted on a tank intermediate the ends thereof and adapted to close a heater circuit when subject to cold water, a member of high expansion material having a two-part conduit therein, one part being a relatively short, small area of cross-section conduit and the other part being a relatively long, larger area of cross-section conduit, said short part being in connection with the inside of the tank, a low wattage heating coil around said long part and a contact arm actuable by the material surrounding said long part of the conduit after a predetermined period of time of energization of said heating coil.

3. A water heater control system for a hot water tank having an electric heater and a thermal retarder switch unit adapted to be mounted on a tank intermediate the ends thereof and adapted to close a heater circuit when subject to cold water, an elongated member of high expansion material having an L-shaped conduit therein, one leg of said conduit being short, open-ended and having a small area of cross-section and adapted to be connected to the inside of said tank, the other leg of said conduit being long, closed-ended and having a larger area of cross-section, a heating coil around said longer conduit and a contact arm actuable by the material surrounding said long part after a predetermined length of time of energization of said heating coil.

4. A water heater control system for a hot water tank having an electric heater, said system comprising a first thermally actuable heater control switch subject to tank water temperature near the lower end of the tank and adapted to be moved to heater circuit closing position when subject to cold water and to be moved into heater circuit opening position when subject to hot water in the tank, a second heater circuit control switch adapted to be moved into heater circuit energizing position at predetermined periods of a 24-hour day, a thermal retarder heater circuit control switch adapted to be mounted on a tank intermediate the ends thereof and comprising a thermally-actuable element subject to tank water temperature adapted to close a heater circuit when subject to cold water and to open said heater circuit when subject to hot water, an elongated member of high expansion material having an L-shaped conduit therein, one leg of said conduit being short, open-ended, of relatively small area of cross-section, and being connected with the interior of said tank, the other leg being longer, closed-ended, of relatively large area of cross-section, a heating coil on said elongated member around said other leg, a contact arm actuable by the material surrounding said other leg and adapted to be moved into heater circuit closing position a predetermined length of time after energization of said heater.

5. A water heater control system for a hot water tank having an electric heater, said system comprising a first thermally-actuable heater control switch subject to tank water temperature near the lower end of the tank and adapted to be moved to heater circuit closing position when subject to cold water and to be moved into heater circuit opening position when subject to hot water in the tank, a second heater circuit control switch adapted to be moved into heater circuit energizing position at predetermined periods of a 24-hour day, a thermal retarder heater circuit control switch adapted to be mounted on a tank intermediate the ends thereof and comprising a thermally actuable element subject to tank water temperature adapted to close a heater circuit when subject to cold water and to open said heater circuit when subject to hot water, an elongated member of high expansion material having an L-shaped conduit therein, one leg of said conduit being short, open-ended, of relatively small area of cross-section and being connected with the interior of said tank, the other leg being longer, closed-ended, of relatively large area of cross-section, a heating coil on said elongated member around said other leg, a contact arm actuable by the material surrounding said other leg and adapted to be moved into heater circuit closing position a predetermined length of time after energization of said heater, the circuit of said electric heater being controlled by said first and second switches and said thermal retarder switch unit, said system being effective to cause energization of said electric heater immediately after closure of said second switch in case said first switch and said thermally-actuable element of said thermal retarder switch are both subject to cold water.

6. A water heater control system for a hot water tank having an electric heater, said system comprising a first thermally-actuable heater control switch subject to tank water temperature near the lower end of the tank and adapted to be moved to heater circuit closing position, when subject to cold water and to be moved into heater circuit opening position when subject to hot water in the tank, a second heater circuit control switch adapted to be moved into heater circuit energizing position at predetermined periods of a 24-hour day, a thermal retarder heater circuit control switch adapted to be mounted on a tank intermediate the ends thereof and comprising a thermally-actuable element subject to tank water temperature adapted to close a heater circuit when subject to cold water and to open said heater circuit when subject to hot water, an elongated member of high expansion material having an L-shaped conduit therein, one leg of said conduit being short, open-ended, of relatively small area of cross-section and being connected with the interior of said tank, the other leg being longer, closed-ended, of relatively large area of cross-section, a heating coil on said elongated member around said other leg, a contact arm actuable by the material surrounding said other leg and adapted to be moved into heater circuit closing position a predetermined length of time after energization of said heater, the circuit of said electric heater being controlled by said first and second switches and said thermal retarder switch unit, said system being effective to cause energization of said electric heater with a predetermined time period of delay after closure of said second switch in case said first switch only is subject to cold water.

7. A water heater control system for a hot water tank having an electric heater, said system comprising a first thermally-actuable heater control switch subject to tank water temperature near the lower end of the tank and adapted to be moved to heater circuit closing position when subject to cold water and to be moved into heater circuit opening position when subject to hot water in the tank, a second heater circuit control switch adapted to be moved into heater circuit energizing position at predetermined periods of a 24-hour day, a thermal retarder heater circuit control switch adapted to be mounted on a tank intermediate the ends thereof and comprising a thermally-actuable element subject to tank water temperature adapted to close a heater circuit when subject to cold water and to open said heater circuit when subject to hot water, an elongated member of high expansion material having an L-shaped conduit therein, one leg of said conduit being short, open-ended, of relatively small area of cross-section and being connected with the interior of said tank, the other leg being longer, closed-ended, of relatively large area of cross-section, a heating coil on said elongated member around said other leg, a contact arm actuable by the material surrounding said other leg and adapted to be moved into heater circuit closing position a predetermined length of time after energization of said heater, the circuit of said electric heater being controlled by said first and second switches and said thermal retarder switch unit, said system being effective to cause energization of said electric heater immediately after closure of said second switch in case said first switch and said thermally-actuable element of said thermal retarder switch are both subject to cold water and with a predetermined time period of delay after closure of said second switch in case said first switch only is subject to cold water.

8. A water heater control system for a hot water tank having an electric heater, said system comprising a first thermally actuable heater control switch subject to tank water temperature near the lower end of the tank and adapted to be moved into heater circuit energizing position when subject to cold water in the tank, a second heater circuit control switch adapted to be moved into heater circuit energizing position at a predetermined period of a 24-hour day, a thermal retarder heater control switch adapted to be mounted on a tank intermediate the ends thereof and comprising a second thermally-actuable element subject to tank water temperature adapted to move to heater circuit energizing position when subject to cold water, an elongated member of high expansion material having an L-shaped conduit therein, one leg of said conduit being short, open-ended, of relatively small area of cross-section and being connected with the interior of said tank, the other leg of said conduit being relatively long, close-ended, of relatively large area of cross-section, a heating coil on said elongated member around said other leg, a contact arm actuable by the material surrounding said other leg, said second thermally-actuable element and said contact arm being connected in parallel with each other and in series electric circuit with said first and said second heater control switch and said electric heater.

9. A water heater control system for a hot water tank having an electric heater, said system comprising a first thermally-actuable heater control switch subject to tank water temperature near the lower end of the tank and adapted to be moved into heater circuit energizing position when subject to cold water in the tank, a second heater circuit control switch adapted to be moved into heater circuit energizing position at a predetermined period of a 24-hour day, a thermal retarder heater control switch adapted to be mounted on a tank intermediate the ends thereof and comprisng a second thermally-actuable element subject to tank water temperature adapted to move to heater circuit energizing position when subject to cold water, an elongated member of high expansion material having an L-shaped conduit therein, one leg of said conduit being short, open-ended, of relatively small area of cross-section and being connected with the interior of said tank, the other leg of said conduit being relatively long, close-ended, of relatively large area of cross-section, a heating coil on said elongated member around said other leg, a contact arm actuable by the material surrounding said other leg, said second thermally-actuable element and said contact arm being connected in parallel with each other and in series electric circuit with said first and said second heater control switch and said electric heater and effecting energization of said electric heater immediately upon closure of said second switch in case said first switch and said second thermally-actuable element are subject to cold water.

10. A water heater control system for a hot water tank having an electric heater, said system comprising a first thermally-actuable heater control switch subject to tank water temperature near the lower end of the tank and adapted to be moved into heater circuit energizing position when subject to cold water in the tank, a second heater circuit control switch adapted to be moved into heater circuit energizing position at a predetermined period of a 24-hour day, a thermal retarder heater control switch adapted to be mounted on a tank intermediate the ends thereof and comprising a second thermally-actuable element subject to tank water temperature adapted to move to heater circuit energizing position when subject to cold water, an elongated member of high expansion material having an L-shaped conduit therein, one leg of said conduit being short, open-ended, of relatively small area of cross-section and being connected with the interior of said tank, the other leg of said conduit being relatively long, close-ended, of relatively large area of cross-section, a heating coil on said elongated member around said other leg, a contact arm actuable by the material surrounding said other leg, said second thermally-actuable element and said contact arm being connected in parallel with each other and in series electric circuit with said first and said second heater control switch and said electric heater and effecting energization of said electric heater with a predetermined time period of delay after closure of said second switch in case said first switch only is subject to cold water.

11. A water heater control system for a hot water tank having an electric heater, said system comprising a first thermally-actuable heater control switch subject to tank water temperature near the lower end of the tank and adapted to be moved into heater circuit energizing position when subject to cold water in the tank, a second heater circuit control switch adapted to be moved into heater circuit energizing position at a predetermined period of a 24-hour day, a thermal retarder heater control switch adapted to be mounted on a tank intermediate the ends thereof and comprising a second thermally-actuable element subject to tank water temperature adapted to move to heater circuit energizing position when subject to cold water, an elongated member of high expansion material having an L-shaped conduit therein, one leg of said conduit being short, open-ended, of relatively small area of cross-section and being connected with the interior of said tank, the other leg of said conduit being relatively long, close-ended, of relatively large area of cross-section, a heating coil on said elongated member around said other leg, a contact arm actuable by the material surrounding said other leg, said second thermally-actuable element and said contact arm being connected in parallel with each other and in series electric circuit with said first and said second heater control switch and said electric heater and effecting energization of said electric heater immediately upon closure of said second switch in case said first switch and said second thermally-actuable element are subject to cold water and effecting energization of said electric heater with a predetermined time period of delay after closure of said second switch in case said first switch only is subject to cold water.

12. A system as set forth in claim 2 and including means for varying said predetermined period of time.

13. A system as set forth in claim 2 and including manually-actuable means for varying said predetermined period of time.

14. A system as set forth in claim 2 and including a manually-adjustable rheostat in series circuit with said heating coil for varying said predetermined period of time.

15. A system as set forth in claim 4 and including means for varying said predetermined length of time.

16. A system as set forth in claim 4 and including manually-actuable means for varying said predetermined length of time.

17. A system as set forth in claim 4 and including a manually-adjustable rheostat in series circuit with said heating coil for varying said predetermined length of time.

18. A system as set forth in claim 11 and including means for varying said predetermined period of time.

19. A system as set forth in claim 11 and including manually-actuable means for varying said predetermined period of time.

20. A system as set forth in claim 11 and including a manually-adjustable rheostat in series circuit with said heating coil for varying said predetermined period of time.

21. In a water heating and control system, the combination with a water tank, a heater therefor, and a thermostat responsive to the temperature of the water in said tank, of, a thermal retarder comprising a container having a small port removed from the bottom thereof, means for mounting said container on said tank with said port communicating with the tank for supplying water from the tank to said container, a heater for said container controlled by said thermostat, and control means comprising a thermostat responsive to the temperature of said container for controlling said heater for said tank.

22. In combination in a thermal timing relay, a container constituting a vaporizer, a controllable heater for vaporizing a liquid therein, a second container constituting a reservoir, said vaporizer having a port near the top thereof opening through a conduit into said reservoir for alternate flow of fluid to and from said vaporizer, said vaporizer opening only into said reservoir and characterized by the lack of any passage between said vaporizer and reservoir which with said one passage would permit continuous circulation of fluid therebetween, said one passage being so constricted that egress of vapor prevents substantial ingress of liquid to said vaporizer, and a thermally responsive control device operable in response to a preset temperature of said vaporizer.

23. The combination of claim 22 wherein said heater is electrically energized.

24. In combination in a thermal timing relay, a container constituting a vaporizer, a controllable heater for vaporizing a liquid therein, reservoir and supply means having connections to said vaporizer near the top thereof characterized by the lack of passages for permitting any substantial continuous circulation of fluid between said vaporizer and reservoir, whereby said vaporizer is adapted to receive liquid and to discharge vapor alternately, and a thermally responsive control device operable in response to temperature change of said vaporizer.

25. In a water heating and control system, the combination with a water storage means, a heater therefor, and a thermostat responsive to the temperature of the water in said storage means, of, a thermal retarder comprising a container having a small port removed from the bottom thereof, reservoir and supply means connected to said port for alternately receiving vapor therefrom and supplying liquid thereto, a heater for said container controlled by said thermostat for vaporizing liquid in said container, and control means comprising a thermostat responsive to the temperature of said container for controlling said heater for said tank.

CLARK M. OSTERHELD.

REFERENCES CITED

The following references are of record in the file of this patent:

UNITED STATES PATENTS

| Number | Name | Date |
|---|---|---|
| 1,803,852 | Jackson | May 5, 1931 |
| 1,964,732 | Homan | July 3, 1934 |
| 2,156,082 | Crago | Apr. 25, 1939 |
| 2,339,276 | Larson | Jan. 18, 1944 |
| 2,356,206 | Boucher | Aug. 22, 1944 |
| 2,368,773 | Osterheld | Feb. 6, 1945 |
| 2,427,444 | Colombo | Sept. 16, 1947 |